(12) United States Patent
Baseri et al.

(10) Patent No.: US 10,910,800 B1
(45) Date of Patent: Feb. 2, 2021

(54) COVER ASSEMBLY FOR ELECTRICAL BUSBAR CONNECTION

(71) Applicant: Rivian IP Holdings, LLC, Plymouth, MI (US)

(72) Inventors: Ehsan Baseri, Irvine, CA (US); Herbert J. Collick, Roseville, MI (US); Casey Dunn, Laguna Hills, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 0 days.

(21) Appl. No.: 16/660,650

(22) Filed: Oct. 22, 2019

(51) Int. Cl.
 *H02B 1/20* (2006.01)
 *H02G 5/04* (2006.01)
 *H02G 5/00* (2006.01)
 *H02B 1/26* (2006.01)

(52) U.S. Cl.
 CPC ............... *H02B 1/20* (2013.01); *H02B 1/26* (2013.01); *H02G 5/007* (2013.01); *H02G 5/04* (2013.01)

(58) Field of Classification Search
 CPC . H02B 1/20; H02B 1/26; H02G 5/007; H02G 5/04; H01R 11/284; H01R 13/44; H01R 13/447; H01R 13/5213
 See application file for complete search history.

(56) References Cited

U.S. PATENT DOCUMENTS

| | | | | |
|---|---|---|---|---|
| 3,960,427 A | * | 6/1976 | Piaget | H01R 4/70 439/147 |
| 4,288,504 A | * | 9/1981 | Julian | H01R 11/28 429/179 |
| 4,483,910 A | * | 11/1984 | Julian | H01M 2/206 429/179 |
| 4,938,715 A | * | 7/1990 | Jones | H01H 85/202 439/620.26 |
| 5,346,408 A | * | 9/1994 | Chupak | H01R 11/284 174/138 F |
| 5,791,936 A | * | 8/1998 | Nicholson | H01R 13/5213 439/521 |

(Continued)

OTHER PUBLICATIONS

Kostal: High Voltage: Simple. Modular. Safe., 2018, 9 pages, Leopold Kostal GmbH & Co. KG, Web site accessed on Jan. 17, 2020 at https://www.kostal.com/en-gb/innovation/hv-batteriemodulverbinder.

*Primary Examiner* — Oscar C Jimenez
(74) *Attorney, Agent, or Firm* — Clements Bernard Walker

(57) ABSTRACT

Various disclosed embodiments include cover assemblies for an electrical busbar connection, busbar connector assemblies, and battery systems. In an illustrative embodiment, a cover assembly for an electrical busbar connection includes an electrically insulative busbar cover configured to receive therein an end of an electrical busbar. Electrically insulative fastener receptacles extend from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human. Electrically insulative retaining tabs extend into an interior of each of the fastener receptacles intermediate the first opening and the second opening.

29 Claims, 8 Drawing Sheets

(56) References Cited

U.S. PATENT DOCUMENTS

| | | | | |
|---|---|---|---|---|
| 5,990,610 | A * | 11/1999 | Matsumoto | H01R 33/7678 |
| | | | | 174/137 B |
| 10,461,517 | B1 * | 10/2019 | Vignes | H02G 5/04 |
| 2003/0146016 | A1 * | 8/2003 | Johnson | H01R 13/447 |
| | | | | 174/138 F |
| 2005/0164565 | A1 * | 7/2005 | Fricchione | H01R 4/646 |
| | | | | 439/797 |
| 2005/0233648 | A1 * | 10/2005 | Siracki | H01R 9/24 |
| | | | | 439/721 |
| 2010/0240238 | A1 * | 9/2010 | Hattori | H01R 13/5213 |
| | | | | 439/135 |
| 2012/0103684 | A1 * | 5/2012 | Maguire | H01R 11/284 |
| | | | | 174/72 A |
| 2014/0179171 | A1 * | 6/2014 | Mortun | H01H 11/0031 |
| | | | | 439/701 |
| 2016/0118728 | A1 * | 4/2016 | Herrema | H01M 2/204 |
| | | | | 439/726 |
| 2016/0141846 | A1 * | 5/2016 | Atchley | H02B 13/005 |
| | | | | 361/605 |
| 2018/0375227 | A1 * | 12/2018 | Kaehny | H01R 11/283 |
| 2020/0067211 | A1 * | 2/2020 | Yamanaka | H01M 2/202 |

* cited by examiner

US 10,910,800 B1

COVER ASSEMBLY FOR ELECTRICAL BUSBAR CONNECTION

TECHNICAL FIELD

The present disclosure relates to electrical power distribution.

BACKGROUND

In engineered systems such as buildings, vehicles, and the like, electrical power may be distributed from a source of electrical power (such as, without limitation, a remote electrical power generation station or an on-site (or in-vehicle) electrical power generator or generators) to one or more electrical loads within the engineered system. As is known, electrical busbars may distribute such electrical power.

Connections between electrical busbars may be entailed to deliver electrical power from the source of electrical power to the one or more electrical loads. For example, such connections between electrical busbars may be entailed due to space constraints, interference (due to components and structure), and the like. In some applications, such connections may be made in electrical power distribution systems that deliver electrical power generated by turbine generators and/or motor generators to one or more electrical loads. In some other applications, such connections may be made in electrical power distribution systems that deliver electrical power generated by electrical batteries to one or more electrical loads to one or more electrical loads.

Regardless of specific type of engineered system, one or more aspects may be entailed regarding connecting electrical busbars. For example, in some manufacturing settings, it may be desirable to provide for automation (such as, for example, by manufacturing robots or the like) in connecting electrical busbars. In some other examples (such as, for example, in some other manufacturing settings by human users or in some maintenance or other servicing scenarios by human users), it may be desirable to provide for protection against electrical shock or the like.

SUMMARY

Various disclosed embodiments include cover assemblies for an electrical busbar connection, busbar connector assemblies, and battery systems.

In some embodiments, a cover assembly is provided for an electrical busbar connection. In such embodiments, the cover assembly includes an electrically insulative busbar cover configured to receive therein an end of an electrical busbar. Electrically insulative fastener receptacles extend from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human.

In some other embodiments, a cover assembly is provided for an electrical busbar connection. In such embodiments, the cover assembly includes an electrically insulative busbar cover configured to receive therein an end of an electrical busbar. Electrically insulative fastener receptacles extend from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly. Electrically insulative retaining tabs extend into an interior of each of the fastener receptacles intermediate the first opening and the second opening.

In some other embodiments, a cover assembly is provided for an electrical busbar connection. In such embodiments the cover assembly includes an electrically insulative busbar cover configured to receive therein an end of an electrical busbar. Electrically insulative fastener receptacles extend from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human. Electrically insulative retaining tabs extend into an interior of each of the fastener receptacles intermediate the first opening and the second opening.

In some other embodiments, a busbar connector assembly includes an electrical connector busbar having a first end and a second end, the connector busbar defining a first hole and a second hole at each of the first and second ends. Two pair of fastener assemblies are configured to be received in the first and second holes. A pair of cover assemblies are provided for an electrical busbar connection. Each cover assembly includes: an electrically insulative busbar cover configured to receive therein an end of the connector busbar chosen from the first end and the second end; electrically insulative fastener receptacles extending from the busbar cover, each fastener receptacle being sized to receive therein one of the pair of fastener assemblies and being configured to be coaxial with the first and second holes, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human; and electrically insulative retaining tabs that extend into an interior of each of the fastener receptacles intermediate the first opening and the second opening, the retaining tabs being configured to retain each of the fastener assemblies in its respective fastener receptacle.

In some other embodiments, a battery system includes at least a first battery module and a second battery module, each of the first and second battery modules having a first terminal for a first polarity and a second terminal for a second polarity. An electrical connector busbar has a first end and a second end, the electrical connector busbar being electrically connected at its first end to the first terminal of the first battery module with a pair of fastener assemblies, the electrical connector busbar being further electrically connected at its second end to the second terminal of the second battery module with another pair of fastener assemblies. A pair of cover assemblies cover the first and second ends of the electrical connector busbar. Each cover assembly includes: an electrically insulative busbar cover configured to receive therein its associated end of the connector busbar; and electrically insulative fastener receptacles extending from the busbar cover, each fastener receptacle being sized to receive therein one of the fastener assemblies, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

Figure 1A:
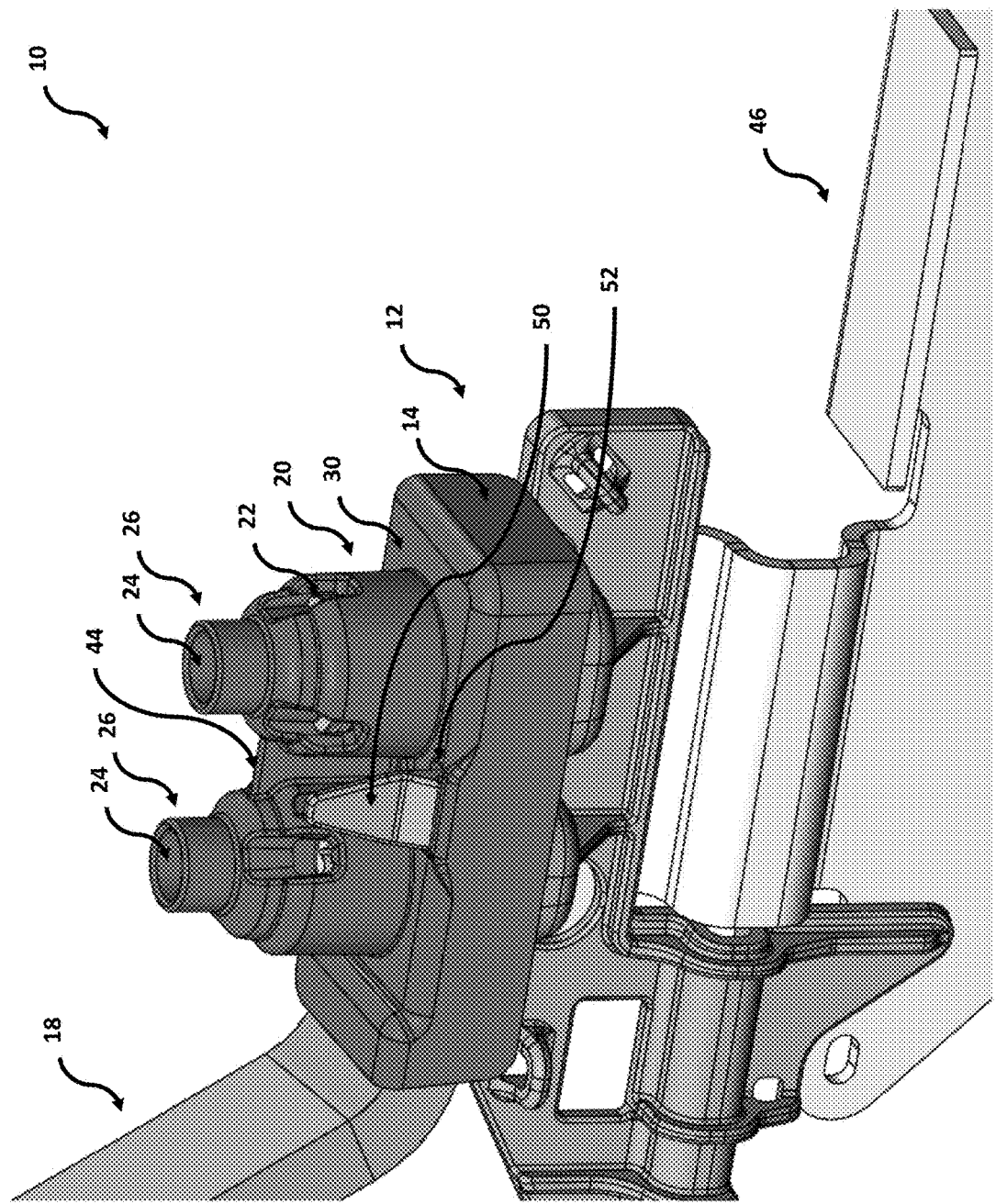
FIG. 1A is a perspective view of an illustrative cover assembly covering an electrical busbar connection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of overview, various disclosed embodiments include cover assemblies for an electrical busbar connection, busbar connector assemblies, and battery systems.

Still by way of overview and as will be explained below by way of non-limiting examples, in some embodiments a cover assembly may help contribute to providing for automation (such as, for example, by manufacturing robots or the like) in connecting electrical busbars. In some embodiments, a cover assembly may help contribute to providing for protection against electrical shock or the like. In some embodiments, a cover assembly may help contribute to providing for automation (such as, for example, by manufacturing robots or the like) in connecting electrical busbars and may help contribute to providing for protection against electrical shock or the like.

Now that an overview has been provided, illustrative details will be provided by non-limiting examples given by way of illustration only and not of limitation.

Referring now to FIGS. 1A-1E, in various embodiments a cover assembly 10 is provided for an electrical busbar connection 12. In such embodiments the cover assembly 10 includes an electrically insulative busbar cover 14 that is configured to receive therein an end 16 (FIG. 1B) of an electrical busbar 18. Electrically insulative fastener receptacles 20 extend from the busbar cover 14, each fastener receptacle 20 being sized to receive therein a fastener assembly 22, each fastener receptacle 20 defining therein an opening 24 at an end 26 distal the busbar cover 14 and an opening 28 (FIG. 1C) at an end 30 proximal the busbar cover 14.

Figure 1B:
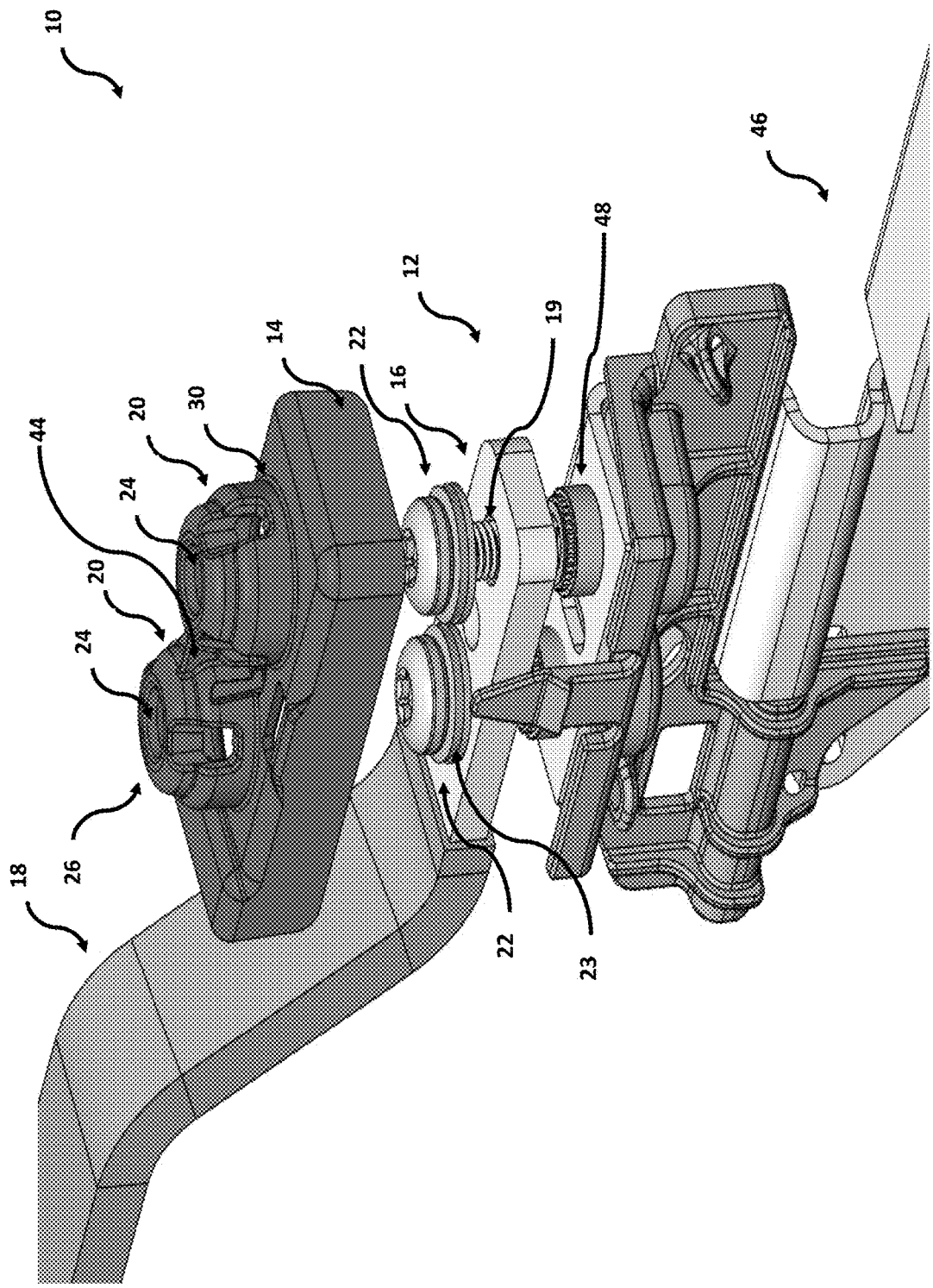
FIG. 1B is an exploded perspective view of the cover assembly and electrical busbar connection of FIG. 1A.
Figure 1C:
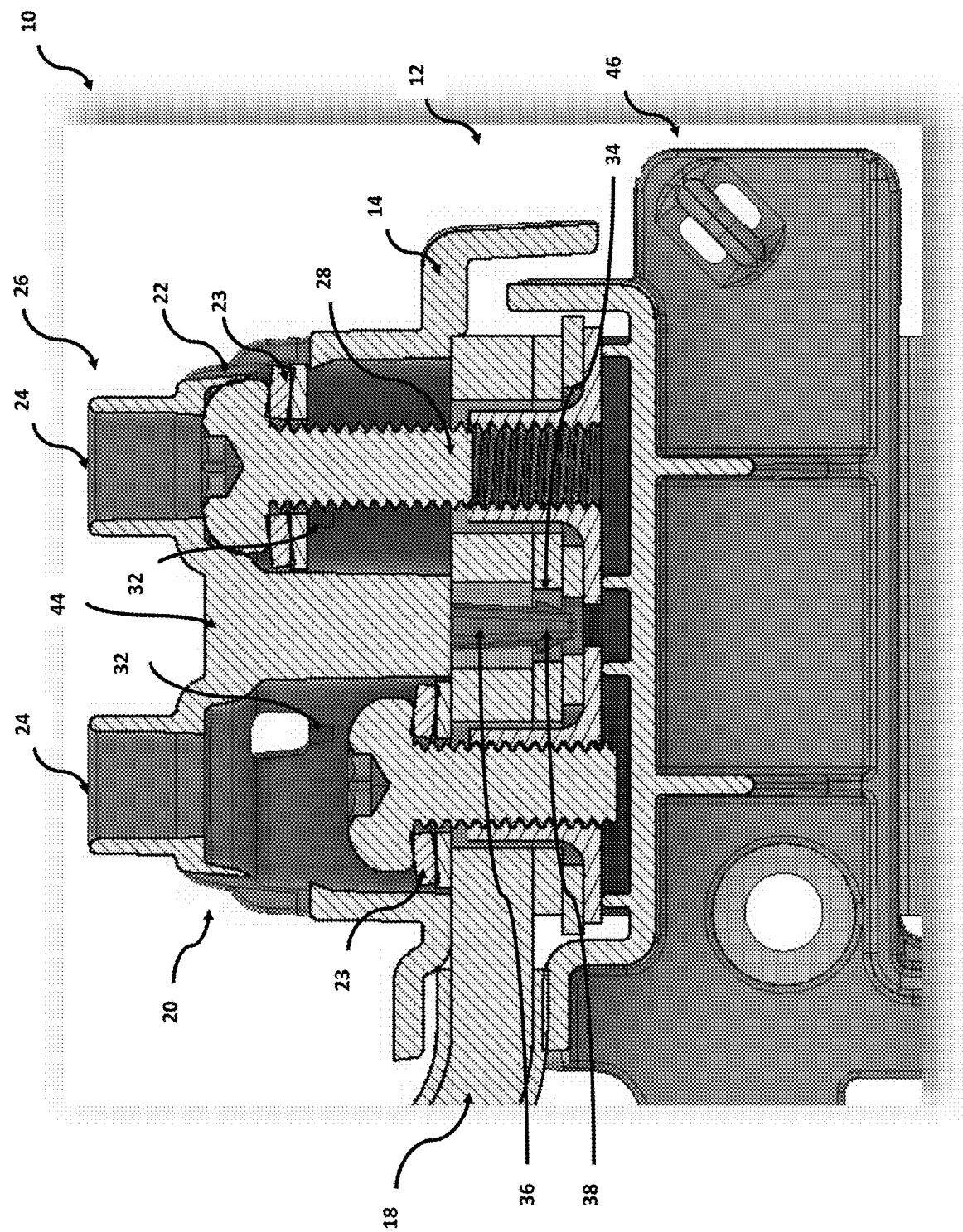
FIG. 1C is a side plan view in cutaway of the cover assembly and electrical busbar connection of FIG. 1A.
Figure 1D:
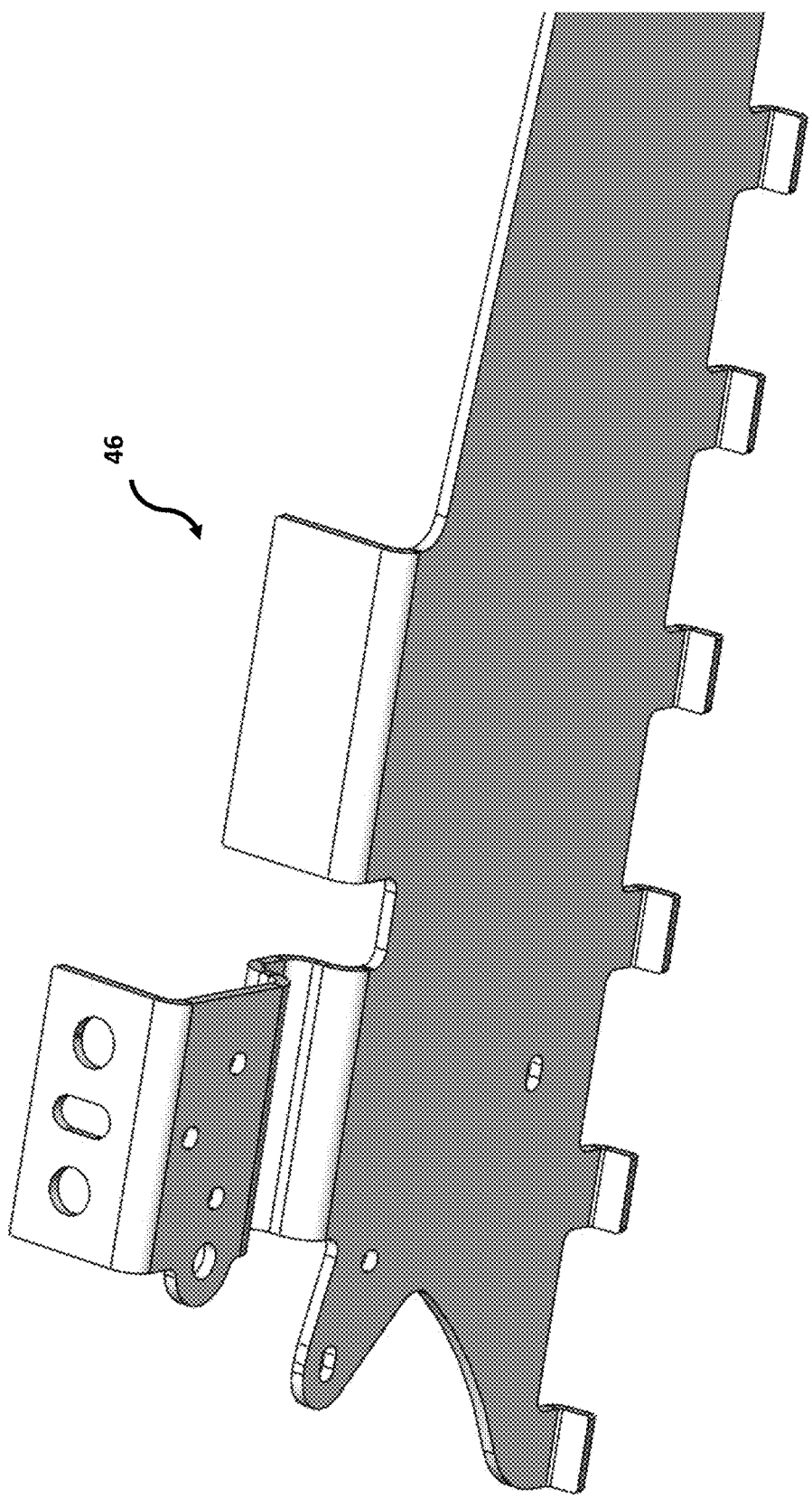
FIG. 1D is a perspective view of an illustrative electrical busbar.
Figure 1E:
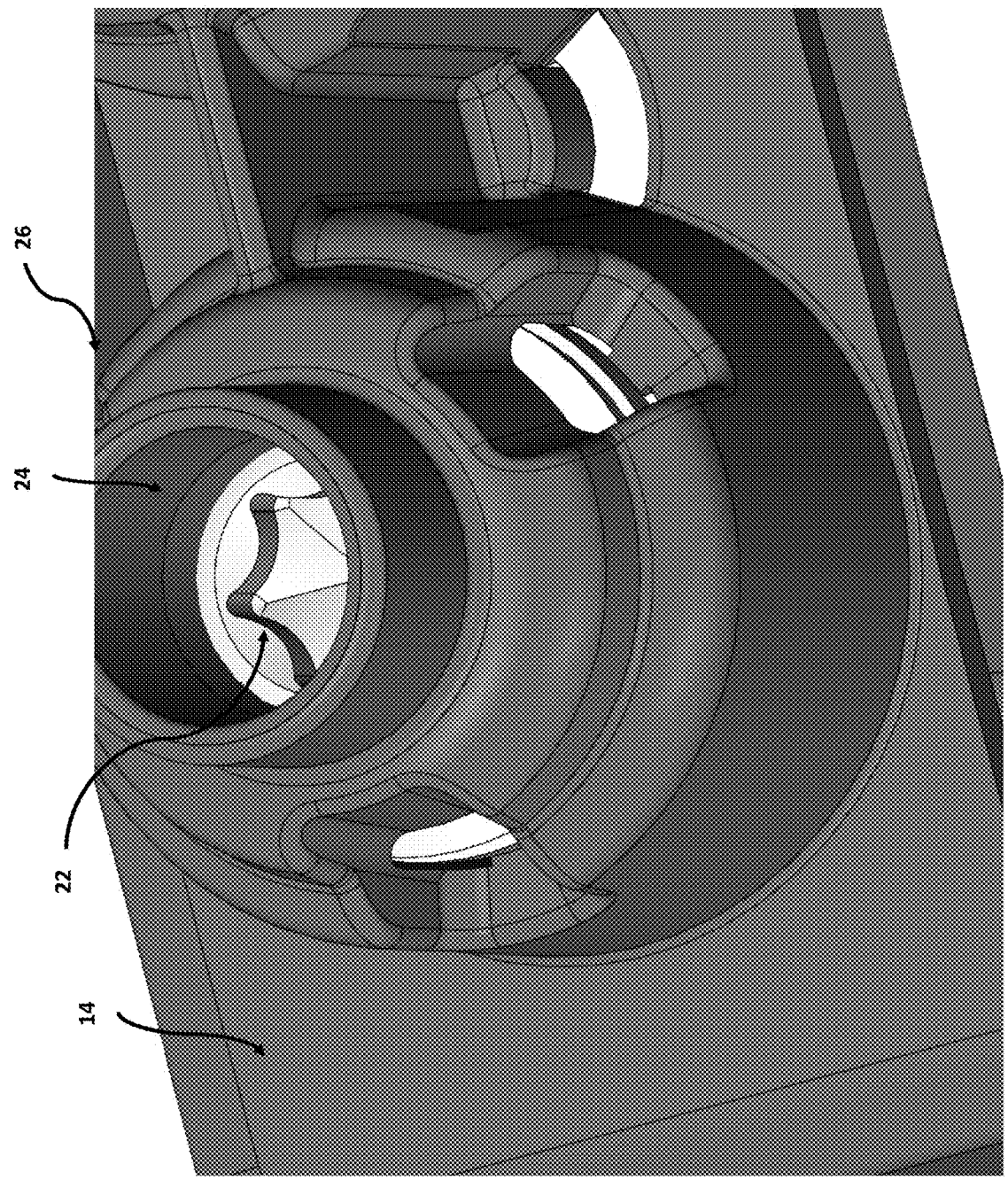
FIG. 1E is a perspective view of details of the cover assembly of FIG. 1A.

In various embodiments and as shown in FIG. 1E, the opening 24 suitably is sized to permit insertion therethrough of a tool (not shown) to turn the fastener assembly 22. It will be appreciated that, in some embodiments, the tool may be an end effector that is operated by factory automation, such as a robot. Such embodiments may be applicable in a manufacturing setting. It will also be appreciated that, in some other embodiments, the tool may be operated by a human operator. Such embodiments may be applicable in a manufacturing setting and in a maintenance (that is, servicing) setting.

In some embodiments, as shown in FIG. 1E the opening 24 may be further sized to prevent insertion therethrough of a finger (not shown) of a human (not shown). It will be appreciated that such embodiments can help contribute to compliance with International Protection Marking (IEC standard 60529—sometimes interpreted as Ingress Protection Marking and sometimes referred to as IP Code). As is known, the IP code provides for solid particle protection. To that end, the IP code can indicate a level of protection that an enclosure can provide against access to hazardous parts (such as, for example, electrical conductors and moving parts) and ingress of solid foreign objects. As is known, Level 2 protection under the IP Code provides for protection against access to hazardous parts (such as electrical conductors and moving parts) and ingress of solid foreign objects (such as fingers or similar objects) with greater than 12.5 mm protection. To that end, in some embodiments, the opening 24 suitably may be sized to prevent insertion therethrough of a finger of a human finger. In such embodiments, the opening 24 may define an inner diameter of around no more than around 12.5 mm or so. It will be appreciated that such embodiments comply with IP Code Level 2 protection standards. As a result, use of the cover assembly 10 means that a human user need not wear high-voltage protective gear when making or breaking a high-voltage (that is, greater than 100 volts) electrical connection by turning the fastener assembly 22.

In various embodiments, electrically insulative retaining tabs 32 (FIG. 1C) extend into an interior of each of the fastener receptacles 20 intermediate the opening 24 and the opening 28. It will be appreciated that, in such embodiments, the retaining tabs 32 can capture and retain captive in the cover assembly 10 its associated fastener assembly 22 before its associated fastener assembly 22 is threadably inserted into a target busbar. Thus, in such embodiments, the retaining tab 32 can releasably capture and retain in its fastener receptacle 20 its associated fastener assembly 22 (such as by engaging one or more washers 23) until the fastener assembly is threadably inserted into a target busbar. In such embodiments, it will be appreciated that the retaining tabs 32 can help prevent the fastener assemblies 22 from encountering interference enroute to insertion and subsequent threaded engagement in a target busbar. As a result, in such embodiments the retaining tabs 32 can help assist in orienting associated fastener assemblies 22 for insertion and subsequent threaded engagement in a target busbar.

It will be appreciated that, as discussed above, in some embodiments the opening 24 may be sized to prevent insertion therethrough of a finger (not shown) of a human (not shown). However, in some other embodiments, the opening 24 need not be sized to prevent insertion therethrough of a finger (not shown) of a human (not shown) as desired for a particular application. It will also be appreciated that, as discussed above, the electrically insulative retaining tabs 32 (FIG. 1C) may extend into an interior of each of the fastener receptacles 20 intermediate the opening 24 and the opening 28. However, in some other embodiments, the electrically insulative retaining tabs 32 (FIG. 1C) need not extend into an interior of each of the fastener receptacles 20 intermediate the opening 24 and the opening 28 as desired for a particular application. Thus, it will be appreciated that, as desired for a particular application: (i) in some embodiments the opening 24 may be sized to prevent insertion therethrough of a finger (not shown) of a human (not shown) but the electrically insulative retaining tabs 32 (FIG. 1C) need not extend into an interior of each of the fastener receptacles 20 intermediate the opening 24 and the opening 28; (ii) in some other embodiments the opening 24 need not be sized to prevent insertion therethrough of a finger (not shown) of a human (not shown) but the electrically insulative retaining tabs 32 (FIG. 1C) may extend into an interior of each of the fastener receptacles 20 intermediate the opening 24 and the opening 28; and (iii) in some other embodiments the opening 24 may be be sized to prevent insertion therethrough of a finger (not shown) of a human (not shown) and the electrically insulative retaining tabs 32 (FIG. 1C) may extend into an interior of each of the fastener receptacles 20 intermediate the opening 24 and the opening 28.

Figure 2:
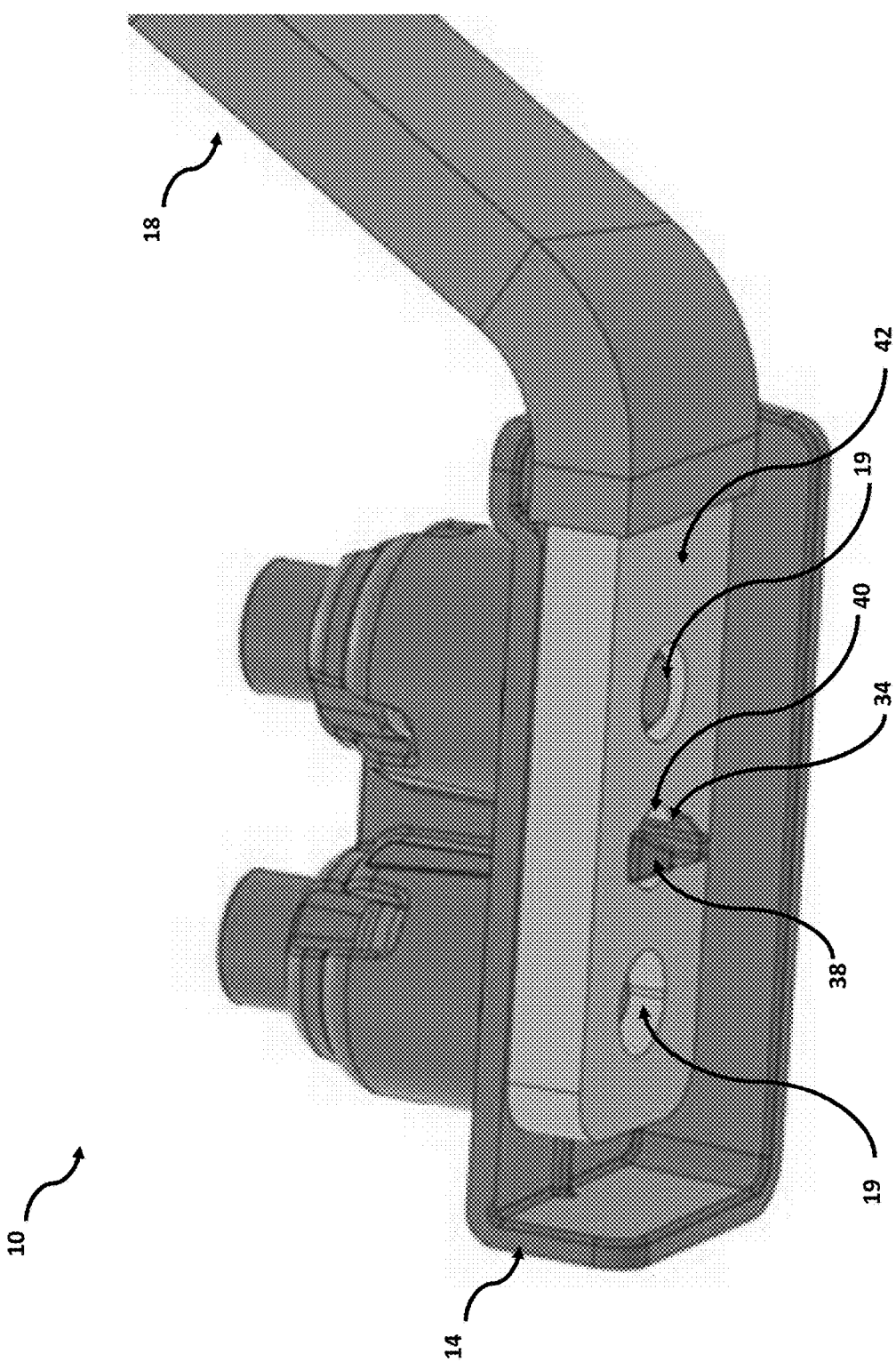
FIG. 2 is a bottom perspective view of the cover assembly of FIG. 1A covering an end of an electrical busbar.

Referring briefly to FIG. 2 and as also shown in FIG. 1C, in various embodiments locking tabs 34 are configured to releasably attach the busbar cover 14 to the electrical busbar 18. Fingers 36 are outwardly biased. Guide surfaces 38 guide the locking tabs 32 through an opening 40 defined in the electrical busbar 18. When the guide surfaces 38 are inserted completely through the opening 40, the fingers 36 cause the locking tabs 32 to spring outwardly and engage a surface 42 of the electrical busbar 18, thereby keeping the cover 14 in place on the busbar 18.

In various embodiments, at least one grip tab 44 may be disposed between the fastener receptacles 20. In various embodiments, the grip tab 44 may be grippable by a factory robot, thereby helping contribute to design-for-automation. It will be appreciated that, in embodiments in which the cover assembly 10 complies with IP Code Level 2 protection standards, a human user may grip the grip tab 44 without wearing high voltage protective gear (such as, for example, gloves).

In various embodiments, the electrical busbar 18 is electrically connected to a target busbar 46 with the fastener assemblies 22. In some embodiments and as shown in FIG. 1B, the busbar 46 may include threaded receptacles 48 that are sized to threadedly engage therein the fastener assemblies 22. In other embodiments, the busbar 46 may define threaded holes therein that are sized to threadedly engage therein the fastener assemblies 22. In some embodiments, the busbar 46 may include guide tabs 50 that engage corresponding sloys 52 in the cover 14 to guide the cover assembly 10 and the busbar 18 into position for electrical connection with the busbar 46. When the cover assembly 10 and the busbar 18 are positioned for electrical connection, a human user or a factory robot uses a tool (not shown) to push the fastener assemblies 22 past the retaining tabs 32 and into and through holes 19 defined in the busbar 18. The fastener assemblies 22 are then turned to threadedly engage threaded surfaces of the busbar 46, thereby physically and electrically connecting the busbars 18 and 46. It will be appreciated that industry standard practices entail use of at least two of the fastener assemblies 22 to preclude making of a high-resistance connection.

It will be appreciated that, in various embodiments, at least the cover assembly 10, the busbar cover 14, the fastener receptacles 20, the retaining tabs 32, the locking tabs 34, the fingers 36, the guide surfaces 38, and the grip tab 44 may be made of suitable materials, such as those with a dielectric strength of at least around 19.7 kV/mm. It will be appreciated that, in various embodiments, the cover assembly 10, the busbar cover 14, the fastener receptacles 20, the retaining tabs 32, the locking tabs 34, the fingers 36, the guide surfaces 38, and the grip tab 44 may also be suitably flame retardant. In some such embodiments, the cover assembly 10, the busbar cover 14, the fastener receptacles 20, the retaining tabs 32, the locking tabs 34, the fingers 36, the guide surfaces 38, and the grip tab 44 may be made of a plastic resin, a polycarbonate, and/or a polycarbonate glass fiber. In such embodiments, the cover assembly 10 and its components may be made by any suitable process, such as injection molding.

As shown in FIG. 2, various embodiments include a busbar connector assembly that includes the electrical connector busbar 18 and cover assemblies 10 attached at each end of the busbar 18. Details regarding the busbar 18, the cover assembly 10, and attachment of the cover assembly 10 to the busbar 18 have been discussed above and need not be repeated for an understanding thereof.

Figure 3A:
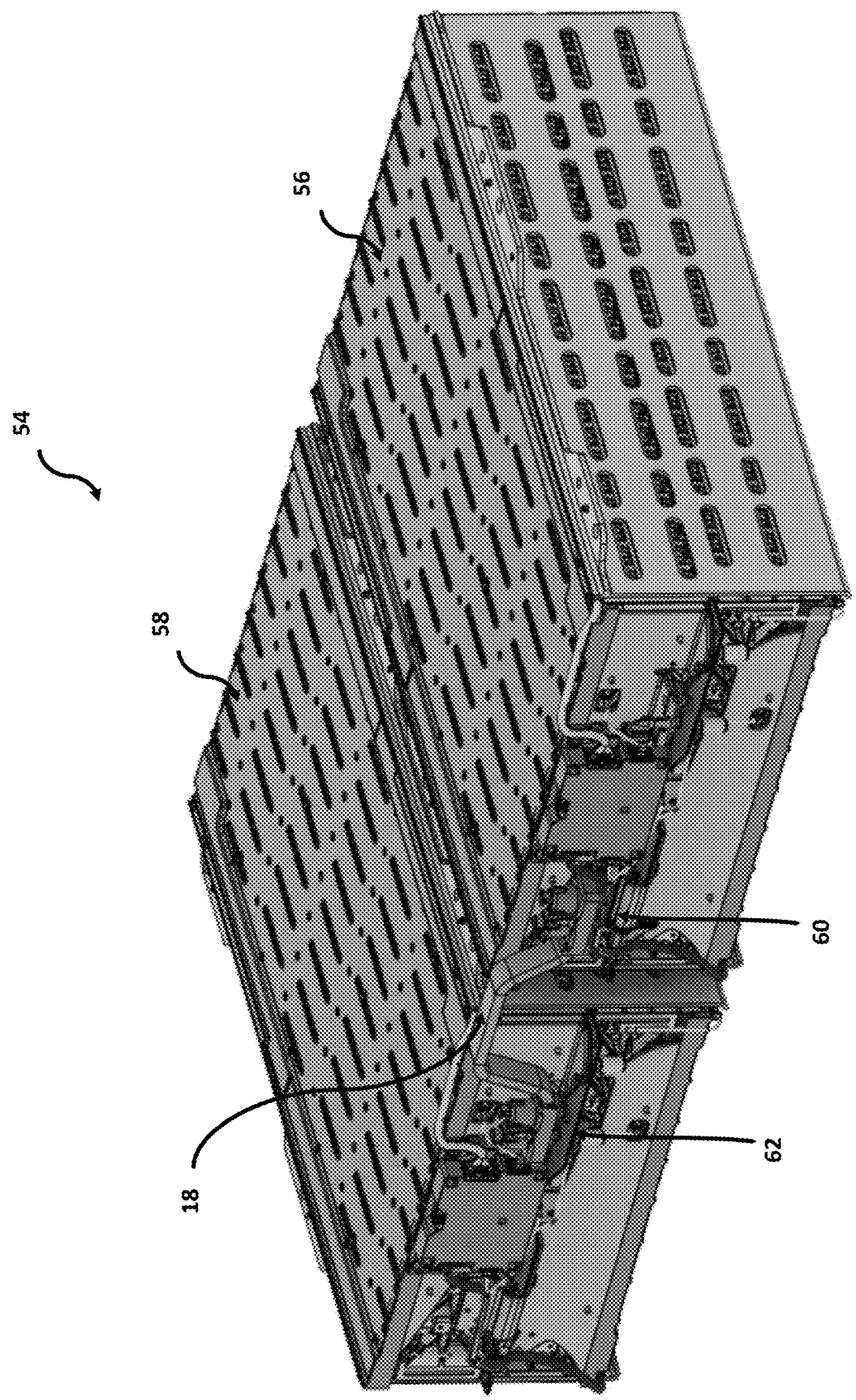
FIG. 3A is perspective view of illustrative a battery system with battery modules electrically connected by a busbar whose connections are covered by the cover assemblies of FIG. 1A.
Figure 3B:
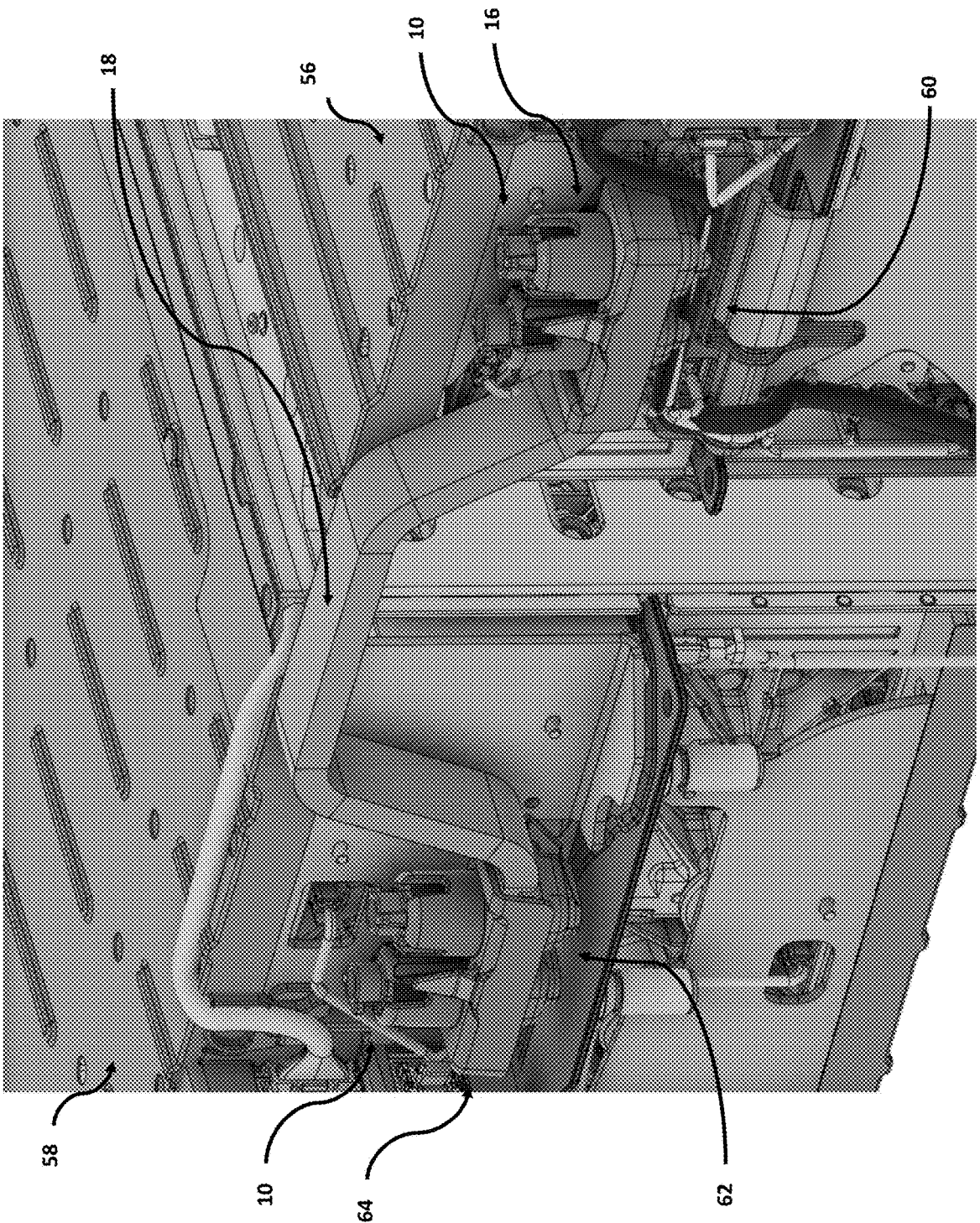
FIG. 3B is a perspective view of details of the battery system of FIG. 3A.

Referring additionally to FIGS. 3A and 3B, in various embodiments a battery system 54 may be provided in which battery modules 56 and 58 are electrically connected with the busbar connector assembly described above. It will be appreciated that the battery system 54 suitably may be used in engineered systems such as buildings, vehicles, and the like.

In such embodiments the battery modules 56 and 58 each have a terminal 60 for a first polarity (such as a positive terminal) and a terminal 62 for a second polarity (such as a negative terminal). It will be appreciated that the terminals 60 and 62 suitably are configured for electrical connection as is the busbar 46 (as shown in FIGS. 1A-1D).

An electrical connector busbar 18 has an end 16 and an end 64. The electrical connector busbar 18 is electrically connected at its end 16 to the terminal 60 (such as a positive terminal) of the battery module 56 with a pair of fastener assemblies 22. The electrical connector busbar 18 is further electrically connected at its end 64 to the terminal 62 (such as a negative terminal) of the battery module 58 with another pair of fastener assemblies 22.

In various embodiments the battery modules 56 and 58 are electrically connected in series via the busbar connector assembly that includes the electrical connector busbar 18 and cover assemblies 10 attached at each end of the busbar 18. That is, the terminal 60 of the battery module 56 is electrically connected to the terminal 62 of the battery module 58. In such embodiments, a busbar connection 12 is made between the terminal 60 of the battery module 56 and the end 16 of the busbar 18 and another busbar connection 12 is made between the terminal 62 of the battery module 58 and the end 64 of the busbar 18—and each such connection 12 is covered by the cover assembly 10.

Details regarding the busbar 18, the cover assembly 10, attachment of the cover assembly 10 to the busbar 18, and electrical connection of the busbar 18 and a target busbar have been discussed above and need not be repeated for an understanding thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cover assembly for an electrical busbar connection, the cover assembly comprising:
    an electrically insulative busbar cover configured to receive therein an end of an electrical busbar; and
    a plurality of electrically insulative fastener receptacles extending from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human.

2. The cover assembly of claim 1, wherein the busbar cover and the fastener receptacles are made of a material with a dielectric strength of at least around 19.7 kV/mm.

3. The cover assembly of claim 2, wherein the busbar cover and the fastener receptacles are made of a material chosen from a plastic resin, a polycarbonate, and a polycarbonate glass fiber.

4. The cover assembly of claim 1, wherein the first opening defines an inner diameter of around no more than around 12.5 mm.

5. The cover assembly of claim 1, further comprising a plurality of locking tabs configured to releasably attach the busbar cover to an electrical busbar.

6. The cover assembly of claim 1, further comprising at least one grip tab disposed between the fastener receptacles.

7. A cover assembly for an electrical busbar connection, the cover assembly comprising:
    an electrically insulative busbar cover configured to receive therein an end of an electrical busbar;
    a plurality of electrically insulative fastener receptacles extending from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly; and
    a plurality of electrically insulative retaining tabs that extend into an interior of each of the fastener receptacles intermediate the first opening and the second opening.

8. The cover assembly of claim 7, wherein the busbar cover, the fastener receptacles, and the retaining tabs are made of a material with a dielectric strength of at least around 19.7 kV/mm.

9. The cover assembly of claim 8, wherein the busbar cover, the fastener receptacles, and the retaining tabs are made of a material chosen from a plastic resin, a polycarbonate, and a polycarbonate glass fiber.

10. The cover assembly of claim 7, wherein the first opening defines an inner diameter of around no more than around 12.5 mm.

11. The cover assembly of claim 7, further comprising a plurality of locking tabs configured to releasably attach the busbar cover to an electrical busbar.

12. The cover assembly of claim 7, further comprising at least one grip tab disposed between the fastener receptacles.

13. A cover assembly for an electrical busbar connection, the cover assembly comprising:
    an electrically insulative busbar cover configured to receive therein an end of an electrical busbar;
    a plurality of electrically insulative fastener receptacles extending from the busbar cover, each fastener receptacle being sized to receive therein a fastener assembly, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human; and
    a plurality of electrically insulative retaining tabs that extend into an interior of each of the fastener receptacles intermediate the first opening and the second opening.

14. The cover assembly of claim 13, wherein the busbar cover, the fastener receptacles, and the retaining tabs are made of a material with a dielectric strength of at least around 19.7 kV/mm.

15. The cover assembly of claim 14, wherein the busbar cover, the fastener receptacles, and the retaining tabs are made of a material chosen from a plastic resin, a polycarbonate, and a polycarbonate glass fiber.

16. The cover assembly of claim 13, wherein the first opening defines an inner diameter of around no more than around 12.5 mm.

17. The cover assembly of claim 13, further comprising a plurality of locking tabs configured to releasably attach the busbar cover to an electrical busbar.

18. The cover assembly of claim 13, further comprising at least one grip tab disposed between the fastener receptacles.

19. A busbar connector assembly comprising:
    an electrical connector busbar having a first end and a second end, the connector busbar defining a first hole and a second hole at each of the first and second ends;
    two pair of fastener assemblies configured to be received in the first and second holes; and
    a pair of cover assemblies for an electrical busbar connection, each cover assembly including:
    an electrically insulative busbar cover configured to receive therein an end of the connector busbar chosen from the first end and the second end;
    a plurality of electrically insulative fastener receptacles extending from the busbar cover, each fastener receptacle being sized to receive therein one of the pair of fastener assemblies and being configured to be coaxial with the first and second holes, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human; and
    a plurality of electrically insulative retaining tabs that extend into an interior of each of the fastener receptacles intermediate the first opening and the second opening, the retaining tabs being configured to retain each of the fastener assemblies in its respective fastener receptacle.

20. The connector assembly of claim 19, wherein the busbar cover, the fastener receptacles, and the retaining tabs are made of a material with a dielectric strength of at least around 19.7 kV/mm.

21. The connector assembly of claim 20, wherein the busbar cover, the fastener receptacles, and the retaining tabs are made of a material chosen from a plastic resin, a polycarbonate, and a polycarbonate glass fiber.

22. The connector assembly of claim 19, wherein the first opening defines an inner diameter of around no more than around 12.5 mm.

23. The connector assembly of claim 19, further comprising a plurality of locking tabs configured to releasably attach the busbar cover to an electrical busbar.

24. The connector assembly of claim 19, further comprising at least one grip tab disposed between the fastener receptacles.

25. A battery system comprising:
   at least a first battery module and a second battery module, each of the first and second battery modules having a first terminal for a first polarity and a second terminal for a second polarity;
   an electrical connector busbar having a first end and a second end, the electrical connector busbar being electrically connected at its first end to the first terminal of the first battery module with a pair of fastener assemblies, the electrical connector busbar being further electrically connected at its second end to the second terminal of the second battery module with another pair of fastener assemblies; and
   a pair of cover assemblies that cover the first and second ends of the electrical connector busbar, each cover assembly including:
   an electrically insulative busbar cover configured to receive therein its associated end of the connector busbar; and
   a plurality of electrically insulative fastener receptacles extending from the busbar cover, each fastener receptacle being sized to receive therein one of the fastener assemblies, each fastener receptacle defining therein a first opening at a first end distal the busbar cover and a second opening at a second end proximal the busbar cover, the first opening being sized to permit insertion therethrough of a tool to turn a fastener assembly, the first opening being further sized to prevent insertion therethrough of a finger of a human.

26. The system of claim 25, wherein the busbar cover and the fastener receptacles are made of a material with a dielectric strength of at least around 19.7 kV/mm.

27. The system of claim 26, wherein the busbar cover and the fastener receptacles are made of a material chosen from a plastic resin, a polycarbonate, and a polycarbonate glass fiber.

28. The system of claim 25, wherein the first opening defines an inner diameter of around no more than around 12.5 mm.

29. The system of claim 25, further comprising a plurality of locking tabs configured to releasably attach the busbar cover to an electrical busbar.

\* \* \* \* \*